US006218761B1

(12) United States Patent
Richter et al.

(10) Patent No.: US 6,218,761 B1
(45) Date of Patent: Apr. 17, 2001

(54) ARMATURE WITH PLANE COMMUTATOR FOR AN ELECTRIC MOTOR

(75) Inventors: Ingo Richter, Markgroeningen; Albert Gerhard, Tamm, both of (DE); Christian Ast, Campinas-SP (BR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/454,120

(22) Filed: Dec. 3, 1999

(30) Foreign Application Priority Data

Dec. 21, 1998 (DE) ........................................ 198 59 006

(51) Int. Cl.[7] ........................................ H02K 1/22

(52) U.S. Cl. ........................ 310/264; 310/231; 310/233

(58) Field of Search ........................ 310/264, 231, 310/233

(56) References Cited

U.S. PATENT DOCUMENTS 5,386,167 * 1/1995 Strobi ........................ 310/237
5,677,588 * 10/1997 Strobl ........................ 310/237
5,925,961 * 7/1999 Sugiyanma ........................ 310/237
5,962,946 * 10/1999 Kobman et al. ........................ 310/233

* cited by examiner

*Primary Examiner*—Nestor Ramirez
*Assistant Examiner*—Thanh Lam
(74) *Attorney, Agent, or Firm*—Michael J. Striker

(57) ABSTRACT

The armature (26) has metal segments (42) separated from each other by grooves (46) distributed around its circumference on a front side thereof. Commutator covers (48) are placed on the segments (42) and soldered with the segments (42) in order to form the plane commutator (32). The commutator cover (48) has respective recesses (50) in its front side facing the metal segments, which correspond in their size and shape at least approximately to the segments (42). When the commutator cover (48) is assembled in the armature each segment (42) is inserted in a corresponding recess (50) of the commutator cover (48) and is soldered in the recess (50). Side surfaces of the segments (42) facing in the circumferential direction and edge surfaces pointing radially inwardly are covered by the commutator covers (48). The commutator covers (48) are positioned exactly by the metal segments (423) inserted in their recesses and are separated from each other by comparatively small slots (56) in the armature.

5 Claims, 3 Drawing Sheets

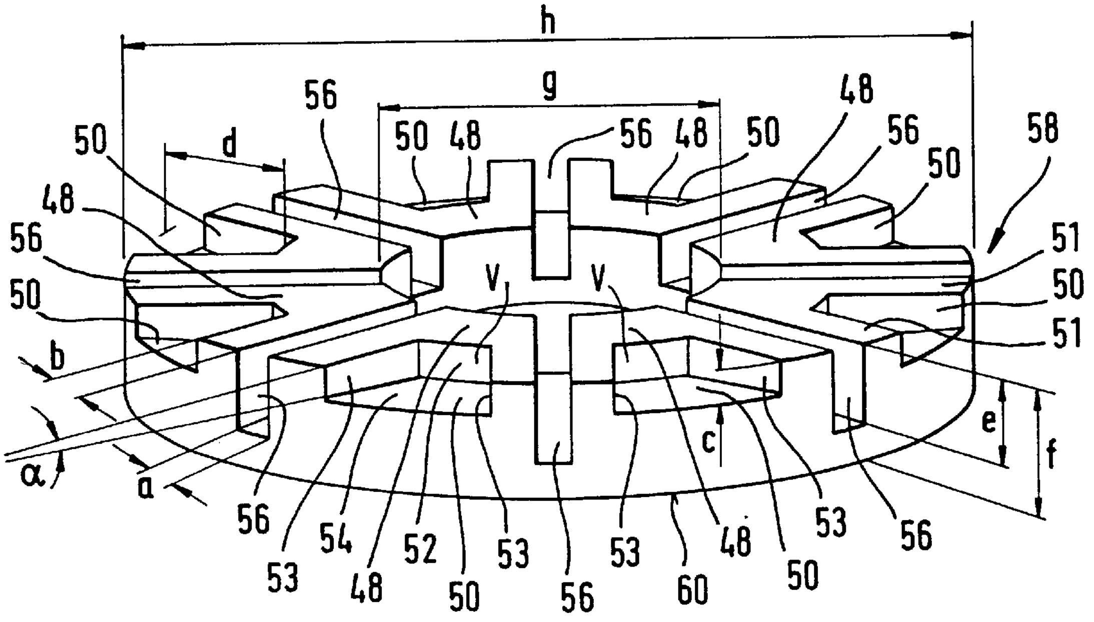
FIG. 3
FIG. 4
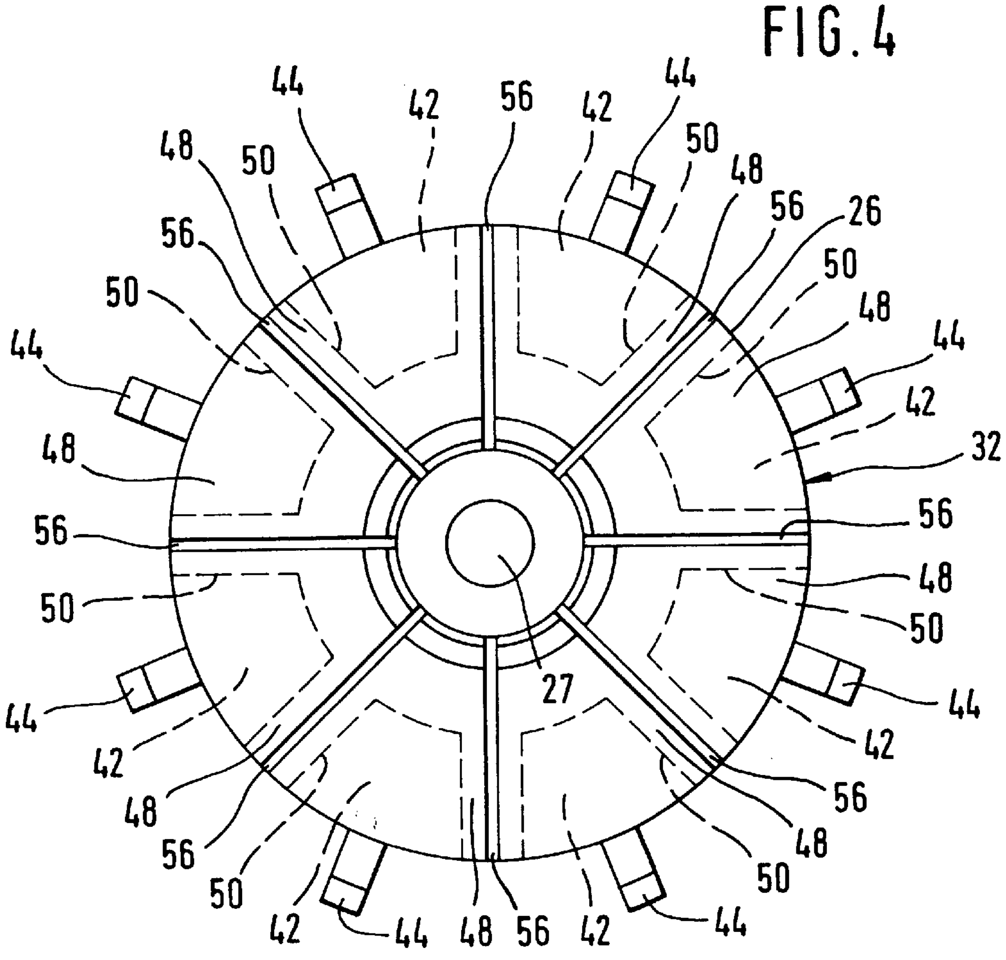

ARMATURE WITH PLANE COMMUTATOR FOR AN ELECTRIC MOTOR

BACKGROUND OF THE INVENTION

1. Field of the Invention

The present invention relates to an armature with a flat or plane commutator for an electric motor, especially for driving a fuel supply unit, in which the armature has a plurality of metal segments separated from each other by grooves distributed around its circumference on a front side thereof, which are connected with armature windings and which are each covered with a commutator cover at least on a front side thereof which is soldered to the respective metal segment.

2. Prior Art

This type of armature is described in European Patent Document EP 0 491 904. This armature has metal segments separated from each other by grooves distributed around the circumference on the front side. Each segment is covered on its front side with a commutator cover which is soldered with the segment. The commutator covers are separated from each other by slots which correspond to the grooves separating the segments from each other. When the covers are assembled on the armature, it must be guaranteed that the slots separating them must coincide with the grooves separating the segments so that the covers must be very exactly positioned. The slots between the covers must be formed somewhat wider than the grooves separating the segments to compensate for measurement tolerances of the segments. However the slots between the covers should be formed as small as possible because of operational considerations for the electric motor. Furthermore when the covers are soldered with the segments the solder can enter the grooves between the segments or in the slots between the covers and that can lead to a short circuit between neighboring segments or covers. During the soldering the covers are not fixed so that the covers can take incorrect positions relative to the segments.

Furthermore the side surfaces of the segments pointing in the circumferential direction are exposed, so that a deposit can be formed on the metal segments during operation of the electric motor in a corrosive media. The corrosion product formed can lead to a short circuit between the neighboring segments.

SUMMARY OF THE INVENTION

It is an object of the present invention to provide an armature with a flat commutator for an electric motor of the above-described kind that does not suffer from the above-described disadvantages.

These objects, and others which will be made more apparent hereinafter, are attained in an armature with a flat commutator for an electric motor, especially for driving a fuel supply unit, in which the armature has a plurality of metal segments separated from each other by grooves distributed around its circumference on a front side thereof, which are connected with armature windings and which are each covered with a commutator cover at least on a front side thereof which is soldered to the respective metal segment.

According to the invention each commutator cover has a recess on its side facing the armature, in which the associated segment is inserted in a direction of the longitudinal axis of the armature and each commutator cover is connected with its associated segment with solder in the recess.

The armature according to the invention with the flat commutator has the advantage that each cover is exactly positioned relative to the associated segment by the segment inserting itself in its corresponding recess and its position is exactly maintained during the soldering. The grooves between the segments can be comparatively wide, since they are covered after connecting the covers and only slots remain between the covers which can be comparatively small because of the exact positioning of the covers. Furthermore the recesses in the covers guarantee that no solder can enter between the covers or segments.

Especially advantageous embodiments and features are claimed in the dependent claims appended hereinbelow.

In a preferred embodiment the commutator covers at least partially cover the edge surfaces of the metal segments pointing in the circumferential direction and/or the edges surfaces of the metal segments pointing radially inward. In this way the segments are protected from corrosion when the motor is used in the presence of corrosive media.

In another preferred embodiment the recesses or cavities in the commutator covers each have an indentation or depression. Because of this advantageous feature solder cannot flow out of the recess.

BRIEF DESCRIPTION OF THE DRAWING

The objects, features and advantages of the invention will now be illustrated in more detail with the aid of the following description of the preferred embodiments, with reference to the accompanying figures in which:

FIG. 3 is a perspective view of a disk-shaped cover according to one embodiment of the invention; and FIG. 4 is a transverse cross-sectional view through the armature.

DETAILED DESCRIPTION OF THE PREFERRED EMBODIMENTS

Figure 1:
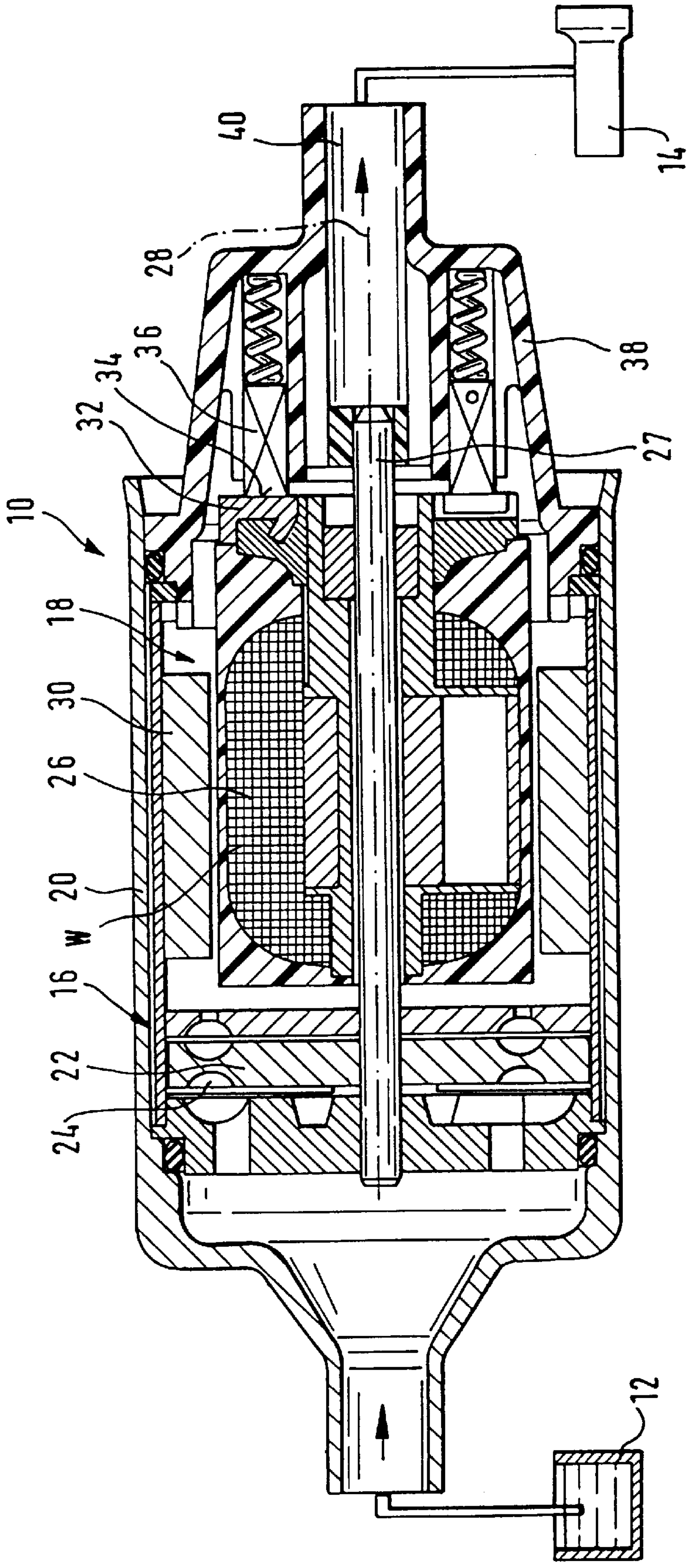
FIG. 1 is a longitudinal cross-sectional view through a fuel supply unit including an electric motor.

A unit 10 for supplying fuel from a fuel tank 12 to an internal combustion engine 14 of a motor vehicle is shown in FIG. 1. The fuel supply unit 10 can be, for example, in the fuel tank 12. The fuel supply unit 10 has at least one fuel pump 16 and an electric motor 18 to drive the fuel pump. The fuel pump 16 and the electric motor 18 are arranged in a housing 20 next to each other. The fuel pump 16 has a feed element 22, which for example is formed as an impeller, which is provided with a plurality of blades distributed around its periphery and which rotates in a pump chamber. The electric motor has an armature 26, with a shaft 27, by which it is mounted so as to be rotatable around its longitudinal axis 28. The feed element 22 of the fuel supply pump 16 is connected with the shaft 27 and rotates with it. Several magnetic segments 30 are distributed around the circumference of the armature 26.

The armature 26 has a plane commutator 32 on its end facing the feed pump 16. Brushes 36 bear on the front surface 34 of the flat commutator 32 extending perpendicular to the longitudinal axis 28 of the armature 26. The brushes 36 are arranged in a cap 38 closing the housing 20. The plane commutator 32 is connected with armature windings W of the armature 26. During operation of the fuel supply unit 10 the feed element 22 is driven rotatably by the electric motor 18 so that fuel is fed by it, which flows through the electric motor 18 and leaves via an outlet 40 in the cap 38 thus arriving in the internal combustion engine 14.

Figure 2:
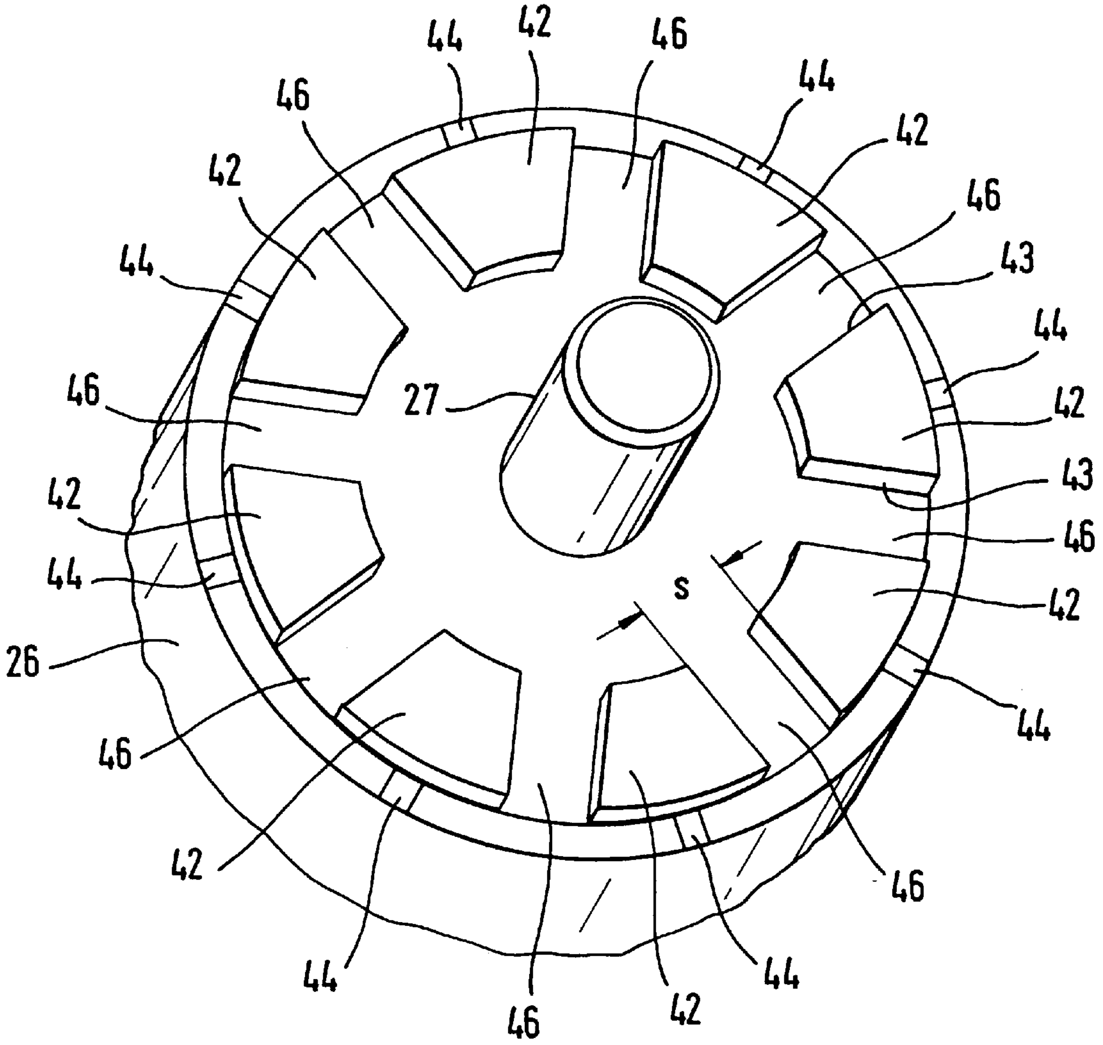
FIG. 2 is a detailed perspective view of an armature of the electric motor.

The armature 26 of the electric motor 18 is shown in FIG. 2 with its plane commutator still not completed and with its front surface magnified. The armature 26 has metal, especially copper, segments 42 distributed over its circumference on its front side. Each segment 42 is connected with a winding of the armature 26 by means of a connector 44 arranged on its radial outer edge. The segments 42 are separated from each other by radially extending grooves 46, extend radially outward to the casing of the armature 26 and extend radially inward but not completely to the shaft 27. A throughgoing metal disk is mounted on the armature 26 during manufacture of the armature 26, which is turned or milled on its front side facing away from the armature to a predetermined depth, in which an inner annular space is turned or milled out to the shaft 27 and the grooves 46 are milled during the manufacture and separation of the metal segments 42. The width s of the grooves 46 can be from about 2 to 6 mm, for example, according to the size of the armature 26.

A respective cover 48 shown in FIGS. 3 and 4 is placed on each segment 42 as shown in FIGS. 3 and 4 to form the planar commutator 32 according to the invention. The covers 48 cover the associated segments 42 and the brushes 36 bear or contact on the covers. The covers 48 are made of carbon, for example, from graphite or plasticized carbon and are galvanized. Each cover 48 is formed somewhat wider at the outer periphery of the armature 26 and extends in a radial direction further inward than the associated segment 42. Each cover 48 is approximately of equal width in the radial direction as its associated segment 42. Each cover 48 has a recess 50 in its front side facing the armature 26, which corresponds in its form and size at least approximately to the form and size of the associated segment 42. Each recess 50 is somewhat wider than its associated segment 42 because of tolerance considerations. Each cover 48 has a web or ridge 51 on each side of its recess 50. The recess 50 is bounded on a radially inner side by a wall 52 and is open on a radially outer side. Each cover 48 is placed on its associated segment 42 so that the segment 42 inserts at least partially into the recess 50 in a direction of the longitudinal axis 28 of the armature 26.

To connect the cover 48 with the segment solder is put in the recesses 50, the segments 42 are inserted in the recesses 50 and subsequently the covers and/or the segments are heated, so that the solder melts. The depth c of the recess 50 of the cover 48 in the direction of the longitudinal axis 28 of the armature 26 is preferably dimensioned so that the lateral edge surfaces 43 of the segment 42 inserted in the recess are covered by the lateral edge surfaces 53 of the recess 50 pointing in the circumferential direction to as large an extent as possible. The lateral edge surfaces 43 of the segment 42 are covered by the cover 48 and the fuel supplied by the fuel supply unit 10 cannot or at least can only scarcely come into contact with them. A flow of solder from the recesses 50 is prevented by the webs 51 arranged beside the segments 42.

The recess 50 has a bottom surface 54 in the direction of the longitudinal axis 28. The bottom surface 54 can preferably be inclined so that the depth of the recess 50 increases from its radial outer edge to its radial inner edge and thus forms a depression or indentation V within the recess 50. In FIG. 3 the inclination of the bottom surface 54 is shown by illustrating the angle $\alpha$. The indentation or depression V in the recess 50 can be formed in another way, for example by a step at the radial outer edge of the recess 50 or by providing the bottom surface 50 with a curved shape to the radial inner wall 52 of the recess 50. The liquid solder remains in the recess 50 and thus does not flow out because of its own weight due to the indentation or depression in the recess 50 during soldering of the cover 48 with the segment 42, when the cover 48 is arranged with its recess 50 pointing or opening upward and when the armature 26 is inserted from above with its segments 42 in the recesses 50.

When the assembled covers 48 are soldered with the associated segments 42, the complete plane or flat commutator 32 is produces as it is shown in FIG. 4. Slots 56, which have a respective width a, which is smaller than the width s of the original grooves 46 between the segments 42, remain between the covers 48. The webs 52 of the covers 48 are arranged in the grooves 46. Since the covers 48 can be exactly positioned relative to the segments by the segments 42 engaging in the recesses 50, the slots 56 can be comparatively small.

Since the assembly of the covers 48 individually or separately would be very expensive, the covers 48 are preferably formed as part of a one-piece disk-shaped body 48, which is shown in FIG. 3. The disk-shaped body 58 can, for example be made by pressing and has at least one approximately plane surface 60 on its front side facing the armature 26. The disk-shaped body 58 has the respective recesses 50 for the covers 48 on its front side facing the metal segments. The recesses 50 can be formed already on pressing the body or subsequently they can be provided by milling. Moreover the slots 56, which are formed by milling or preferably by sawing, are provided in the front side of the disk-shaped body 58 facing the armature. During the sawing two diametrically opposed slots are formed simultaneously. The depth of the recess 50 in the direction of the longitudinal axis 28 of the armature 26 is indicated with c and the depth of the slot 56 is indicated with e. The depth e of the slot 56 is larger than the depth c of the recess 50. The webs 51 laterally bounding the recess 50 have a width b. The disk-shaped body 58 has a thickness f, an outer diameter h and an inner diameter g. The length of the recess 50 in the radial direction is indicated with d. The outer diameter h and the inner diameter g of the disk-shaped body 58 are adjusted to the diameter of the armature 26. The width b of the webs 51 can amount to from about 1 to 2 mm for example. The depth c of the recesses can for example be about 1 to 3 mm and the depth e of the slots 56 can, for example, be about 2 to 4 mm. The thickness f of the disk-shaped body 58 can be, for example, about 4 to 6 mm.

The disk-shaped body 58 is put on the segments 42 of the armature 26 and is connected by solder with the segments 42. Subsequently the front side 60 of the disk-shaped body 58 facing away from the armature 26 is cut, especially by turning, until the slots 56 are open up to the front side of the covers 48 facing away from the armature 26. When the slots 56 are open, thus the covers 48 are separate from each other and the individual covers 48 are formed.

The segments 42 of the armature 26 are at least partially covered on their side surfaces pointing in the circumferential direction and on their edges surfaces pointing radially inwardly and only the edges surface of the segments 42 pointing radially outward are exposed. The side surfaces and the edges surfaces pointing radially inwardly of the segments 42 do not come into contact with the fuel supplied by the fuel supply unit 10 so that no corrosion occurs on these surfaces when a corrosive fuel is being supplied. If necessary the individual free edge surfaces of the segments 42 pointing radially outward can be provided with a protective coating.

The disclosure in German Patent Application 198 59 006.7 of Dec. 21, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an armature with a plane or flat commutator for an electrical motor, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. An armature for an electric motor, said armature (26) having a longitudinal axis (28) and comprising armature windings (W) and a flat commutator (32), and wherein said commutator (32) comprises respective metal segments (42) separated from each other by grooves (26) and distributed around a circumference of said commutator on a front side thereof, said respective metal segments (42) being connected with said armature windings (W), and corresponding commutator covers (48) covering said respective metal segments (42); and wherein said corresponding commutator covers (48) are provided with respective recesses (50) in a side thereof facing said metal segments, said respective metal segments (42) are inserted in said respective recesses (50) in a direction of the longitudinal axis (28) of the armature and said commutator covers (48) are connected with said metal segments (42) by means of solder placed in said respective recesses (50).

2. The armature as defined in claim 1, wherein said corresponding commutator covers (48) at least partially cover lateral edge surfaces (43) of said respective metal segments (42), said lateral edge surfaces (43) facing in a circumferential direction around said commutator, as well as other edge surfaces of said metal segments (42) facing radially inward.

3. The armature as defined in claim 1, wherein said recesses (50) are open in a radial outward direction.

4. The armature as defined in claim 1, wherein said recesses (50) are each provided with a depression (V).

5. The armature as defined in claim 4, wherein said depression (V) in each of the recesses (50) of the commutator covers (48) is formed by a radially downwardly inclined bottom surface (54) of the recess (50).

* * * * *